United States Patent [19]
La Rocca

[11] 3,812,421
[45] May 21, 1974

[54] LIQUID COATING MEASURING APPARATUS

[76] Inventor: Gerard A. La Rocca, 901 Via Mirado, Palos Verdes Estates, Calif. 90274

[22] Filed: Aug. 24, 1972

[21] Appl. No.: 283,577

[52] U.S. Cl. .......................................... 324/58.5 B
[51] Int. Cl. .......................................... G01r 27/04
[58] Field of Search .................... 324/58.5 B; 73/150

[56] References Cited
UNITED STATES PATENTS
3,364,421  1/1968  Bullwinkel ................. 324/58.5 B X
3,562,642  2/1971  Hochschild .................... 324/58.5 B Primary Examiner—Stanley T. Krawczewicz

[57] ABSTRACT

Apparatus for measuring a liquid coating passing through a pair of hollow bars, tubes, or rods. The hollow tubes are electronically driven by a time domain reflectometer having appropriate apparatus therewith for sampling a coating having a dielectric constant which is measured to provide a general measurement of the coating. The measurement of the dielectric constant is then taken with respect to a reference such as the tubes or a temperature controlled cable.

Specifically, the apparatus can be used for measuring the latex content of a carpet wherein the latex has been applied as a water and latex mixture and then passed between the respective sensor tubes providing a readout of the dielectric constant of the latex by means of a recorder as well as a cathode ray tube (CRT) display.

The apparatus employs a power supply, a plurality of one-shots to provide positioning delays, and reference sample locations. The entire device can be utilized with a plurality of stations so that the character of the material having a dielectric constant can be measured at various places.

17 Claims, 7 Drawing Figures

PATENTED MAY 21 1974 3,812,421
SHEET 1 OF 3
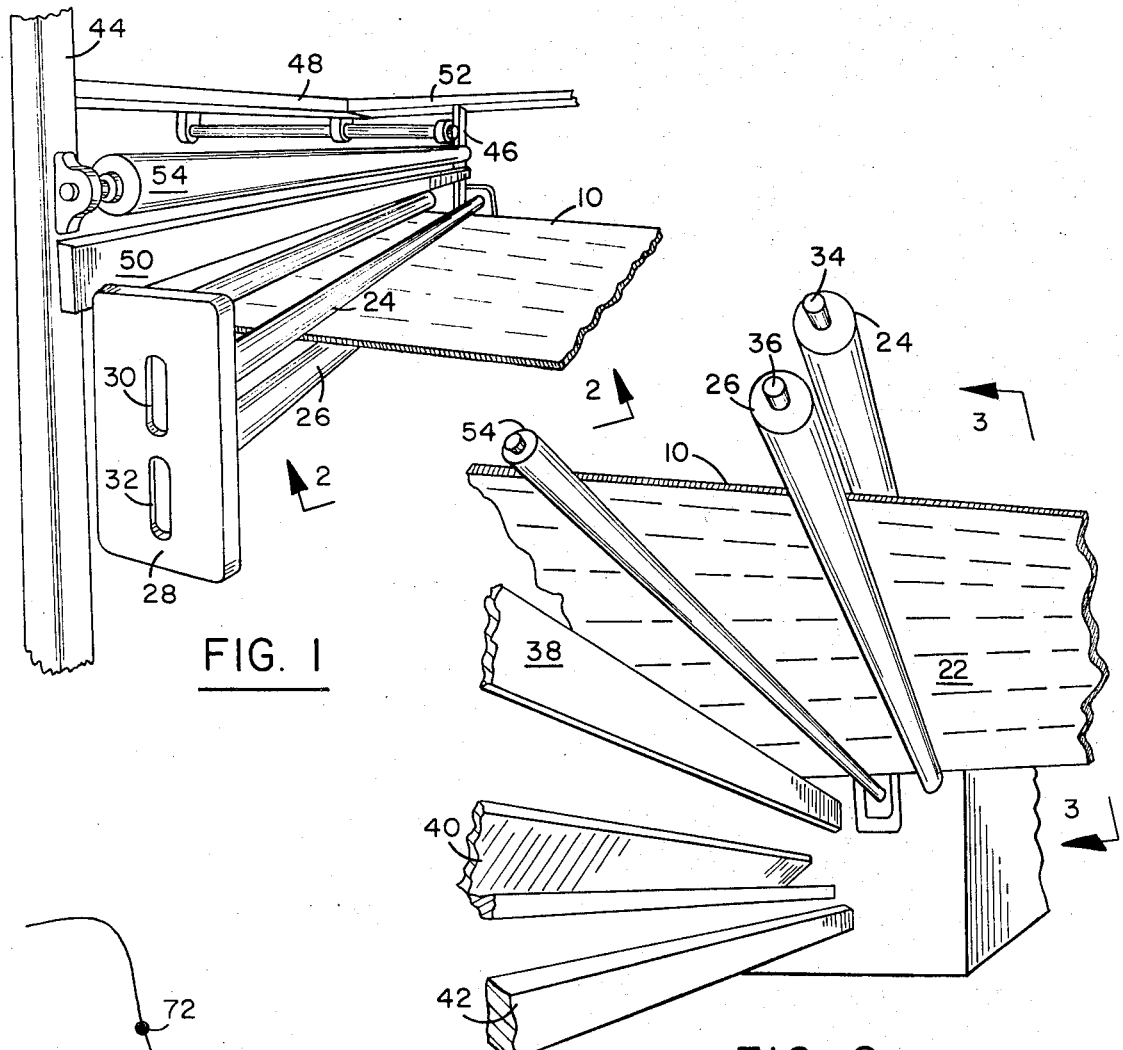
FIG. 1
FIG. 2
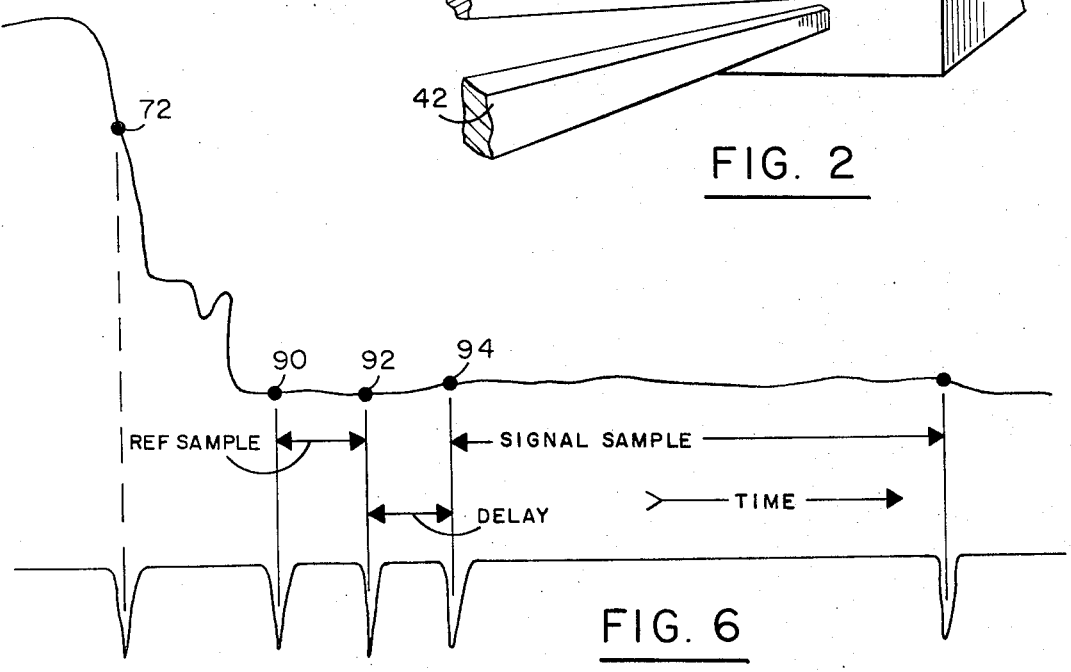
FIG. 6

TIME SEQUENCE OF VARIOUS PULSE

# 3,812,421

LIQUID COATING MEASURING APPARATUS

BACKGROUND OF THE INVENTION

1. Field of the Invention

The field of this invention lies within the coating monitoring art.

2. The Prior Art

The prior art related to various measuring techniques for purposes of determining if the amount of coated material on a continuously processed product has been deficient. Specifically, in the carpet industry for example, the carpet is passed through a latex coater. After the latex has been coated on the carpet, the only determination as to the amount of the latex has been made by weighing the finished product. Specifically, the finished carpet having the latex thereon, has an area cut therefrom and weighed to determine the weight of latex that has been applied to the carpet for that given area.

The foregoing creates problems because of the fact that various amounts of latex have been applied to carpets in the past without effectuating a uniform distribution and proper amount. It is estimated that in plants employing five million dollars worth of latex in one year's period of time, that three hundred thousand dollars worth of latex has been wasted. This apparatus overcomes the deficiencies of the prior art by providing a discrete and exact measurement of the amount of latex being applied to the carpet.

The prior art has encompassed means for applying latex in various quantities depending upon the position of the rollers that place the latex on the carpets. This has not effectuated the proper amount of latex application by reason of the fact that there is oftentimes an excess or insufficient amount of latex applied. This invention overcomes the deficiencies of the prior art by providing a constant monitoring of the latex so that adjustments can be made in the machinery for application on a continuous basis.

It has been known that time domain reflectometry can be utilized for measuring the dielectric constant of a material. Specifically, microwave energy has been applied through time domain reflectometry in the past to measure certain characteristics of dipolar materials to determine whether or not the dipolar materials have a greater or lesser dielectric constant. Such techniques have not utilized the efficient tubular construction of this apparatus. This apparatus has probes in the form of tubular elements which effectively traverse material which is to have the dielectric constant measured. The measurement of the dielectric constant is made by comparing the dielectric constant of the material to a given reference. Specifically, the reference can be the tubes or a temperature compensated line so as to prevent any adjacent structures or material from changing the reference level. Thus, the reference level is always maintained as a constant with respect to its environment and the only given appreciable changes are those changes in the dielectric constant of the material to be measured.

The foregoing means provide an apparatus for measuring the dielectric constant which in effect can be the amount of material placed on an inline processed substance such as latex on a carpet. The apparatus is suitable for measuring the amounts of material such as glue, binders, sizes, and additives placed on any substrate.

SUMMARY OF THE INVENTION

In summation, this invention provides means for discretely measuring the amount of material having a dipolar compound therein on a continuous in-line process.

More specifically, this invention incorporates means for providing a signal on two rods which traverse the material which is being processed. The two rods are respectively a ground and positive rod which receive a pulse from a time domain reflectometer. The time domain reflectometer is controlled by numerous one shots which create an applicable trace as to the dipolar qualities of the materials to be measured with respect to a reference point. The apparatus incorporates not only the foregoing one-shots, but a chart recorder, power supply and certain gating circuits for operating the apparatus.

BRIEF DESCRIPTION OF THE DRAWINGS

The invention will be more clearly understood by reference to the description below taken in conjunction with the accompanying drawings wherein:

FIG. 1 shows a fragmented perspective view of an in-line process utilizing this invention;

FIG. 2 shows the under side of the in-line process in perspective, along lines 2—2 of FIG. 1;

FIG. 6 shows the trace of the time functions; and,

DESCRIPTION OF THE PREFERRED EMBODIMENTS

The Mechanical Apparatus

Figure 5:
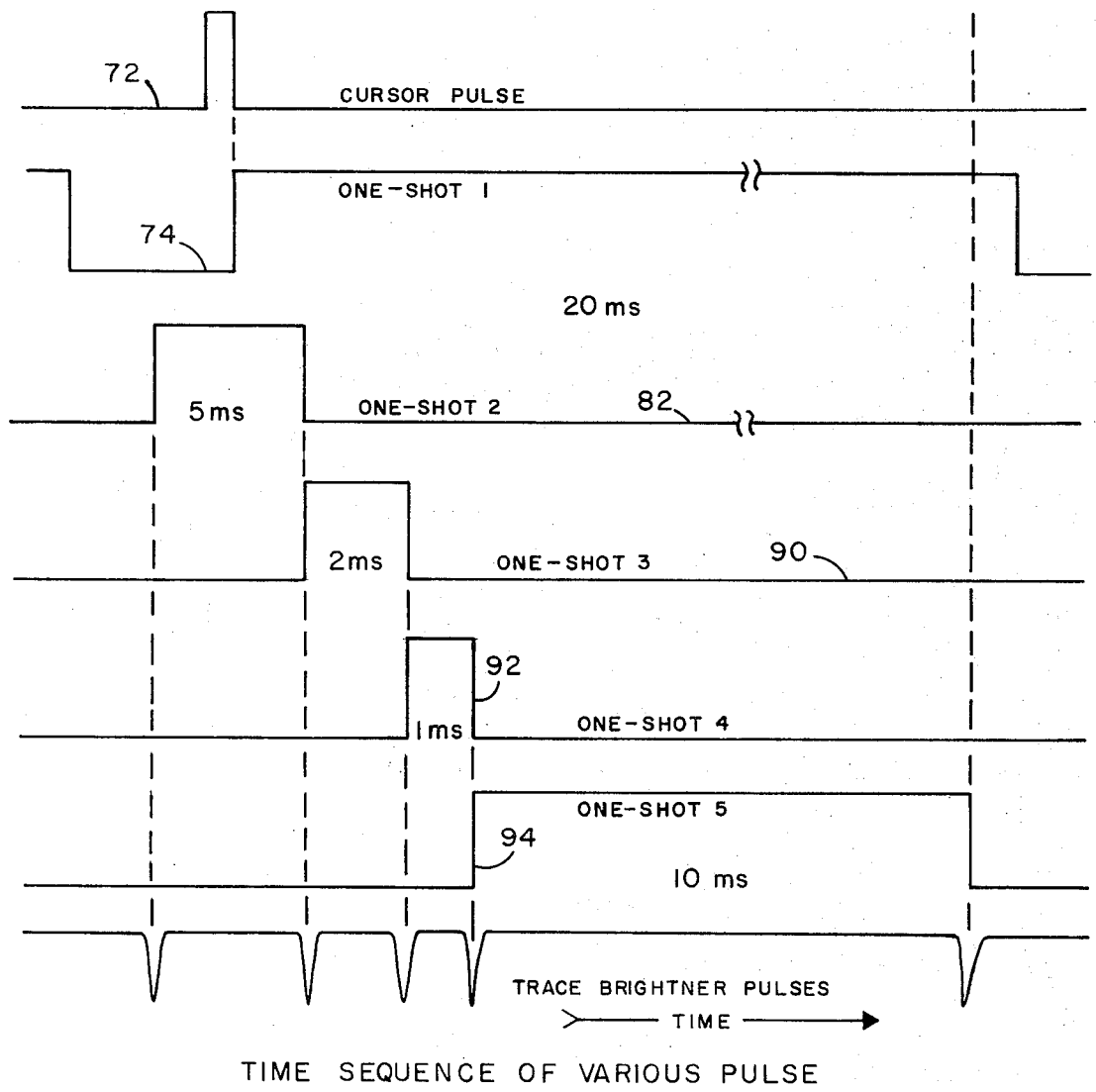
FIG. 5 shows a time sequence of the various electronic pulses generated by this apparatus.
Figure 3:
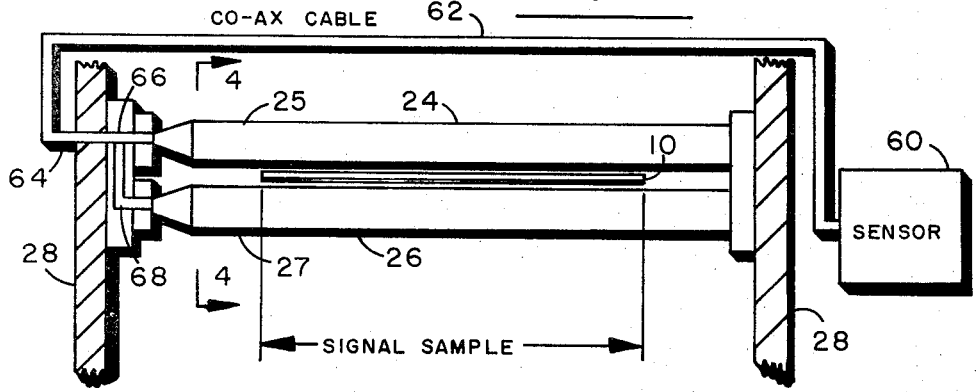
FIG. 3 shows a partially sectioned front elevation view of this invention along lines 3—3 of FIG. 2.
Figure 7:
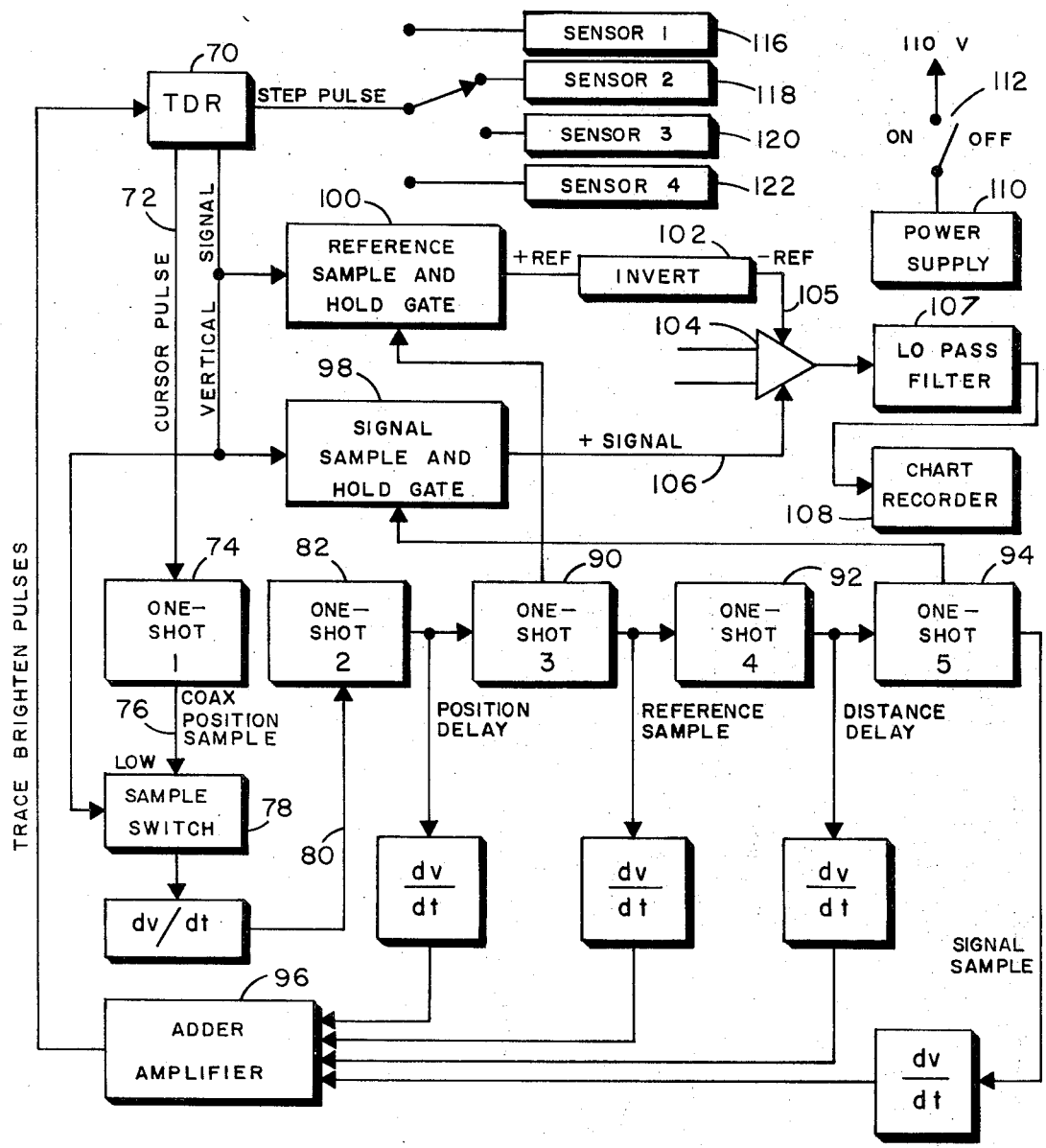
FIG. 7 shows a block diagram of the operative elements of this invention.
Figure 4:
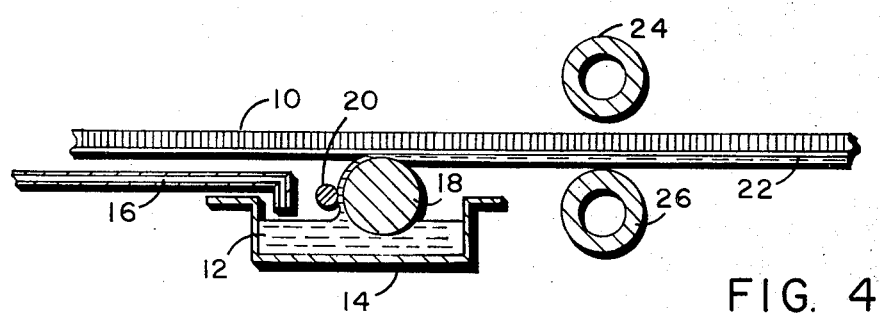
FIG. 4 shows a cross sectional schematic view of a coating apparatus for this invention.

Looking more specifically at FIGS. 1, 2, 3 and 4, a carpet segment 10 is seen moving over a latex bath 12. The latex bath 12 is maintained in a pan 14 and is supplied from a reservoir through pipe 16. The latex 12 is picked up on a roller 18 having a doctor blade or kiss roller 20 which meters the amount of latex on the roller 18. As the roller 18 rotates with the carpet 10 passing thereover, it places a layer of latex 22 on the carpet 10.

The carpet 10 moves through a pair of hollow bars or tubes 24 and 26 which provide the monitoring probes of this invention. The hollow tubes 24 and 26 are journalled in a frame 28 having slots internally oriented within the frame 28. The slots 30 and 32 allow for adjustment of the respective rods 24 and 26 in their journalled orientation by means of changing the position of support spindles 34 and 36 on each respective rod. Thus, the rods 24 and 26 can be adjusted upwardly or downwardly with respect to each other to accommodate various sizes of carpet 10 moving therethrough Furthermore, the rods 24 and 26 can be adjusted to accommodate various electronic characteristics of the surrounding structural environment.

Supporting frame members 38, 40 and 42 serve to support the general area where the carpet passes. Upright frame members 44 and 46 and longitudinal frame members 48, 50 and 52 add increased support. In addition thereto, a roller 54 is shown for purposes of handling the carpet. The roller 54 can be utilized in any suitable manner for threading or winding the carpet as is known in the carpet mill art.

The tubes 24 and 26 are shown connected to the sensor mechanism 60 of this device. The sensor mechanism 60 has a 50 ohm cable 62 extending therefrom which connects with a 93 ohm cable 64. The two respective cables 62 and 64 are coaxial cables. The inner conductor is attached to the tube 24, and the outer conductor is attached to the tube 26 through the respective connections 66 and 68. In this manner, time domain reflectometer which forms a portion of this invention, can monitor the dielectric constant of the carpet 10 passing therethrough.

It should be understood that various materials can pass through the two respective tubes 24 and 26 for purposes of monitoring. The basic concepts hereof provide the monitoring probes 24 and 26 to read the dielectric constant of any material similar to carpet 10 passing therethrough. In other words, plywood using glue having a high dielectric constant, fiberglass packs having a binder with a high dielectric constant, paper products, wall boards, and other items can be monitored as to the amount of material therein. Thus, this invention can be used to monitor many in-line processes where the quanitity of material having a dielectric constant is sought.

Description of the Electronic Monitoring

The monitoring sensor 60 utilizes a time domain reflectometer 70. The time domain reflectometer 70 in the sensor 60 generates several pulses. One of the pulses is a fast stepped pulse having a ramp function and another pulse is a cursor pulse.

The stepped pulse is placed on the coaxial lines 62 and 64 which are connected to the sensor tubes 24 and 26. The pulse on the sensor tubes 24 and 26 is reflected back by impedance mismatches along the lines 62 and 64 as well as the sensor tubes.

The pulse and the reflections are displayed on the oscilliscope, and a readout is provided by means of a trace on a recorder. The magnitude of the mismatches are displayed on the vertical scale of the trace and the distances of the mismatches are displayed on the horizontal scale.

Looking more particularly at the figures, it is seen that the time domain reflectometer (TDR) 70 is within the sensor 60. The TDR provides a cursor pulse 72 as can be seen on the traces. The cursor pulse 72 is delivered to a one-shot 74 providing a one-shot pulse. For purposes of explanation, the pulses as seen on the traces will be numbered in direct analogy to the number of the apparatus issuing the pulse.

As can be seen, the one-shot pulse 74 gates the entire system and in effect is an encompassing gate. The encompassing gating function takes place for a period of 20 ms.

In effect, the gating function holds the system on line during the entire measuring and compiling period.

The one-shot 74 which is triggered by the cursor pulse 72, sends out a signal on line 76 which activates a sample switch 78. The sample switch 78 activates a signal sample and hold gate 98 which will be expanded upon.

The sample switch 78 fires a second one-shot through line 80 so that the second one-shot 82 can provide a 5 ms. pulse which is an enabling gate. The enabling gate 5 ms. pulse of the second one-shot 82 is extended for a 5 ms. period to provide for temperature variances in the system.

The first one-shot 74 provides an encompassing gate which maintains the entire system in an open position for a period of 20 ms. It enables the entire sampling circuits to function so that operation of other portions of the system can be placed on line during this period.

The time history of the sampling can be determined by the showing of FIG. 6 wherein the trace brighteners or pulses with respect to time are shown. The first pulse 72 is in effect the point where the cursor pulse starts and also approximately where the 50 ohm coaxial cable changes to a 93 ohm cable. The different portions of the one-shot system are also shown on the trace as one shots 90, 92 and 94.

The second one-shot 82 actuates a third one-shot 90. The third one-shot 90 serves as a reference sample and it is approximately 2 ms. in time. The third one-shot triggers a fourth one-shot 92 which is approximately 1 ms. long and provides the function of a time delay.

The reference sample is taken off the bars or the tubes 24 and 26 in the initial portions thereof at the approximate points labeled 25 and 27. At points 25 and 27 the microwave energy on the bars 24 and 26 has not seen the dielectric constant of the sample and is only affected by the bars and the surrounding structure. In this manner, the tubes 24 and 26 serve as an accurate reference at points 25 and 27 regardless of the surrounding environment, or the electrical characteristics of the support apparatus. In other words, the reactive characteristics of the surrounding metal as well as other materials in the structure in close proximate relationship to the tubes 24 and 26 do not affect the subsequent sample because the reference always takes this into consideration by reading the tubes first.

The reference can function with respect to any other point or position in the line. For instance, in some cases, it is desirable to have the lines 62 and 64 act as the reference. In some cases, the line 64 can act as a temperature compensated reference with respect to the surrounding environment. In such a case, a portion of the line 64 can be wound and placed in a substantially isothermal condition.

The foregoing use of the cable 64 as the reference facilitates the use of the tube with changing environmental structures such as tenner frames. As can be appreciated, tenner frames move in and out with respect to carpet being coated, so that the electrical reactive environment changes. When the cable is used as a reference, it maintains the reference at an appropriate point.

The fourth one-shot 92 which provides the time delay function, then triggers a fifth one-shot 94 which reads the sample, in this case the carpet 10. The foregoing signals are all connected to an adder-amplifier 96 which takes the signal sample and compares it for purposes of operating the TDR.

In order to cause the function of the foregoing one-shots to read the dielectric constant accurately, the encompassing signal maintains the signal sample hold gate in an open position during a 20 ms. period. A signal sample and hold gate 98 is provided with its output from the sample switch 78 and holds itself open during the time of the subsequent one shots 90, 92 and 94. Upon the fifth one-shot 94 being actuated, the signal sample and hold gate 98 closes thereby allowing the system to take another sample.

A reference sample and hold gate 100 is provided which is driven by the third one-shot 90 which provides the reference signal. The reference signal going into the sample and hold gate 100 delivers the reference signal to an inverter 102 so that a negative reference is provided. The signal sample and hold gate 98 receives the signal sample from the fifth one-shot, namely one-shot 94, and provides a sample signal on line 107. The sample signal on line 106 is connected to a differential amplifier 104 which compares the signal sample with that of the reference on line 105. The output of the amplifier 104 which is equivalent to the sample, is passed to a low pass filter 107 which is connected to a recorder or plotter 108. The recorder or plotter 108 provides an output in the foregoing manner, records the sample signal with respect to the reference, and is therefore an analog function of the amount of latex on the carpet 10.

In order to cause the invention to operate, a power supply 110 is provided from a 110 volt source with a switch 112.

As an aside, it is sometimes useful to take different samples at different points of an in-line process. In order to facilitate this, a multiple series of sensors in the form of bars 24 and 26 can be provided. These are shown as sensors 1, 2, 3 and 4 respectively numbered 116, 118 and 120 and 122. As shown in the particular embodiment, sensor 2 designated 118 is in the operating position and is reading the pulse reflections from tubes 24 and 26.

Summation of the Operation

In summation, the cursor pulse 72 from TDR 70 triggers one-shot 74 which is on for approximately 20 ms. This in effect causes an encompassing function for the foregoing period of time to enable a reference signal and a signal sample to be taken from the carpet. The off time corresponds to the time that the signal is within a few feet of the change in coaxial cable 62 and 64, or in other words, the change from a 50 ohm to a 93 ohm cable. During this time, the sample switch 78 is held open in order to sense the change in the coaxial cables previosuly mentioned.

The reflection due to the change dv/dt between the two coaxial cables 62 and 64 is used as the triggering signal for the timing circuit which is in effect the second one-shot 82. One-shot 82 is approximately 5 ms. in duration and is provided to cover the range starting from the juncture of the two different cables 62 and 64 and extends to the start of the reference sample one-shot, namely one-shot 90.

After the foregoing, one-shot 90 triggers the fourth one-shot 92. In each case when the one-shots are triggered, a greater change of the voltage, namely dv/dt, generates a dot on the oscilliscope by the trace brightener pulses as shown in FIG. 6. These can be generally looked upon as being the time functions of the signals.

The one-shot 90 covers approximately 2 ms. in time which encompasses a portion of the sensor tubes 24 or 26 which have no carpet between them. As a consequence, this could be analogized as a reference signal, and as previously stated is not affected by reason of the surrounding electrically reactive elements in the structure. The fourth one-shot namely one shot 92, is a delay that encompasses a portion of the sensor tubes that lies approximately between the reference tube portion and the carpet sample portion within the sensor tubes 24 and 26. The portion of the sensor tubes 24 and 26 that contains the carpet that is to have the latex material measured is provided with the fifth one-shot, namely one-shot 94. One-shot 94 is approximately 10 ms. and provides a signal sample.

As can be seen in the block diagram, the third one-shot 90 is connected to the reference sample and hold gate 100. In a similar fashion, the fifth one-shot, namely one-shot 94, is connected to the signal sample and hold gate 98. The differences between the sample and the reference which is a function of the amount of latex or dipole material being applied to the carpet 10 is the signal that is passed through the low pass filter 107 by virtue of the foregoing signals being connected to amplifier 104. The low pass filter is connected to a plotter or chart recorder 108. The chart recorder 108 is calibrated to indicate the ounces of latex per square yard being applied to the carpet.

Other calibration means can be utilized to effectively compensate for the different amounts of latex material that is being applied. For instance, if latex has a substantial amount of water in it, the dipoles are greater and there would be less latex actually being applied, although the reading is higher. This is due to the increase in the dielectric constant owing to the greater amount of water. In this case, a potentiometer can be utilized to change the foregoing circuit so as to enable it to vary with respect to the dipole material in the compound.

The foregoing invention can be utilized of course for measuring the dielectric constant of any compound being applied on a continuous basis through the sensor bars 24 and 26. As a consequence, the foregoing invention is only to be read and construed in light of the following claims which define the scope and spirit of this invention.

I claim:
1. A coating monitor comprising:
   a pulse generator providing a signal having a fast rise time substantially as a square wave;
   a pair of conductors electrically connected to said pulse generator in substantially overlying relationship for traversing the coated material to be monitored;
   a first one-shot connected to said pulse generator for purposes of providing a reference signal with respect to the conductors;
   a gate connected to said first one shot for receiving the reference signal;
   a second one-shot connected to said pulse generator for purposes of determining the dielectric constant of the coated material passing between said conductors, thereby providing a sample signal as a function of the dielectric constant of the material;
   a second gate connected to said second one-shot for receiving the second one-shot; and,
   means for differentiating the reference signal from the sample signal.

2. The apparatus as claimed in claim 1 wherein said means for differentiating the reference signal from the sample signal comprises:
   a differential amplifier.

3. The apparatus as claimed in claim 1 further comprising:
a low pass filter connected to said differentiating means for receiving the difference between the sample signal and the reference signal.

4. The apparatus as claimed in claim 3 further comprising:
recording means connected to said low pass filter for recording the dielectric constant of the coated material as indicated by differences between the reference signal and the signal sample.

5. The apparatus as claimed in claim 4 further comprising:
a plurality of switch positions on said pulse generator for sampling a plurality of pairs of conductors in various locations where the coated material has been applied.

6. The apparatus as claimed in claim 4 further comprising:
a coaxial cable connected between said pulse generator and said conductors.

7. The apparatus as claimed in claim 6 wherein said coaxial cable comprises:
a first lower impedance cable; and,
a second higher impedance cable.

8. The apparatus as claimed in claim 6 further comprising:
a means for issuing a cursor pulse from said time delay reflectometer.

9. The apparatus as claimed in claim 6 further comprising:
a third one-shot for providing an encompassing signal; and,
a fourth one-shot for providing an enabling signal both of which are connected to said pulse generator.

10. The apparatus as claimed in claim 9 further comprising:
a fifth one-shot connected to said pulse generator for providing a delay between said first and second one-shots.

11. Apparatus for monitoring the dielectric constant of a carpet which has been coated with latex comprising:
a first tube supported for overlying the carpet;
a second tube supported for underlying said carpet, whereby a space is provided between said first and second tube for the passage of carpet therethrough;
a pulse generator which produces a substantially square wave electrically connected to said tubes which issues a signal along said first and second tubes;
a first one-shot connected to place a signal on a reference portion of said tubes;
a second one-shot connected to place a sample signal on said tubes at a point where said carpet is passing therethrough; and,
means connected to said first and second one-shots to differentiate said reference signal from said sample signal.

12. The apparatus as claimed in claim 11 wherein said means for differentiating said reference signal from said sample signal comprises:
a reference sample hold gate;
a signal sample hold gate; and,
a differential amplifier connected to said reference and signal sample hold gates for providing a signal at its output as a function of said sample signal with said reference signal subtracted therefrom.

13. The apparatus as claimed in claim 12 further comprising:
a means connected to said differential amplifier for recording the differences between said sample signal and said reference signal.

14. The apparatus as claimed in claim 13 further comprising:
a plurality of tubes at different locations; and,
electrical connection means to sample from each one of said tubes at said different respective locations.

15. Apparatus as claimed in claim 14 further comprising:
a third one-shot for providing an encompassing signal for gating the entire circuit;
a means for providing a cursor pulse from said pulse generator;
a fourth one-shot connected for enabling the first and second one shots; and,
a fifth one-shot connected to said pulse generator for creating a delay between said first and second one-shots.

16. The apparatus as claimed in claim 13 further comprising:
a coaxial cable emanating from said pulse generator having one portion thereof connected to one of said tubes and a second portion thereof connected to the other tube.

17. The apparatus as claimed in claim 12 further comprising:
mechanical supports connected to said tube for adjusting the orientation of said tubes.

* * * * *